June 5, 1956 R. S. KOFFORD 2,748,795
AUTOMATIC WATERING DEVICE FOR POULTRY
Filed June 9, 1954
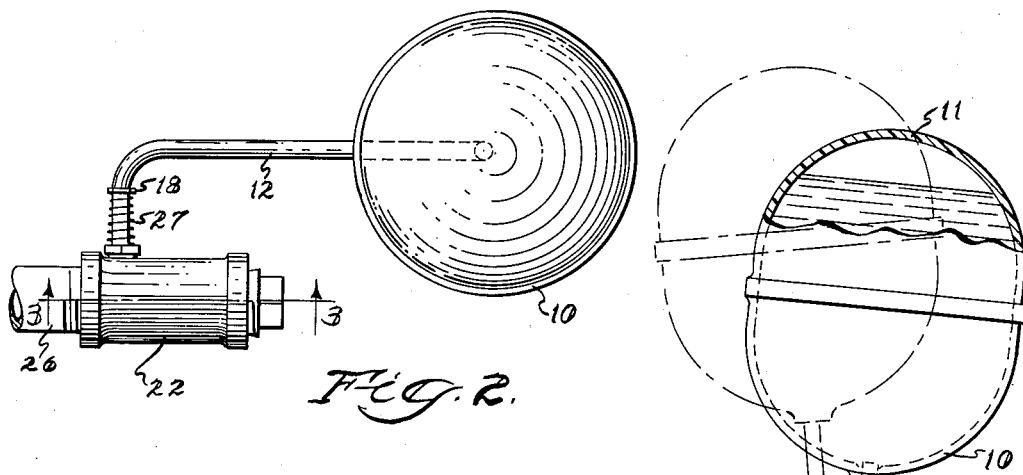
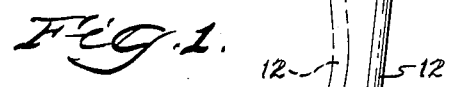
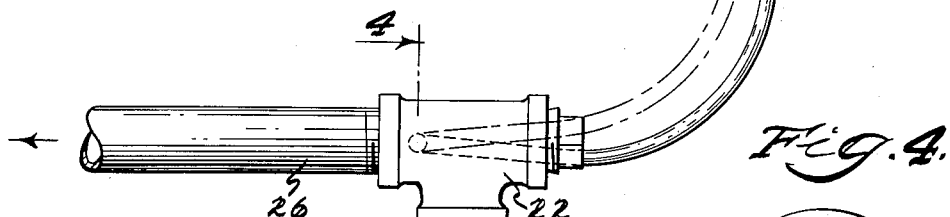
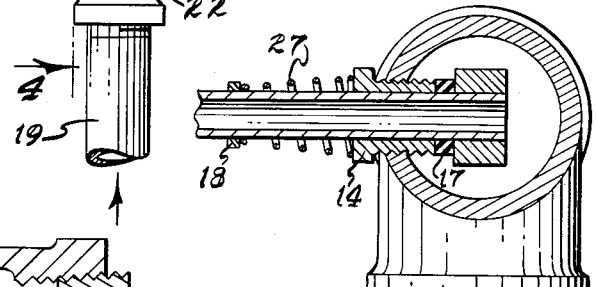
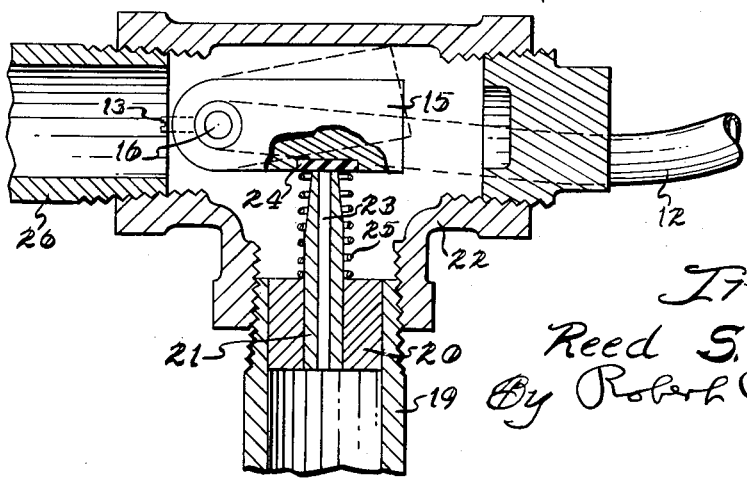
Inventor:
Reed S. Kofford
By Robert C. Comstock
Atty.

United States Patent Office 2,748,795
Patented June 5, 1956

2,748,795
AUTOMATIC WATERING DEVICE FOR POULTRY

Reed S. Kofford, Van Nuys, Calif.

Application June 9, 1954, Serial No. 435,509

3 Claims. (Cl. 137—408)

This invention relates to an automatic watering device for poultry or other animals and more particularly to such a device which is adapted to be used in connection with a conventional source of pressure water supply.

It is an object of my invention to provide such a device which acts as a "pressure reducer" by automatically providing a limited flow of water from a conventional source.

It is an object of my invention to provide such a device which is extremely simple in structure, economical to manufacture and efficient in operation, to provide an improved type of regulated water supply.

It is a further object of my invention to provide such a device in which the weight of water contained in a water reservoir is used to control the operation of a valve which controls the supply of water.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of my device, with the water reservoir partly broken away at the top and the valve opening position of the reservoir shown in dotted lines;

Fig. 2 is a top plan view of the same;

Fig. 3 is an enlarged detailed sectional view of my valve assembly, taken on line 3—3 of Fig. 2;

Fig. 4 is an enlarged detailed sectional view of a portion of my valve assembly taken on line 4—4 of Fig. 1.

A preferred embodiment which has been selected to illustrate by invention comprises a hollow water reservoir 10, which is adapted to receive and hold water. Reservoir 10 is provided adjacent the top thereof with an air vent 11, which permits air to enter and leave reservoir 10 inversely with the passage of water.

Reservoir 10 is mounted on one end of an elongated curved hollow tube 12, the other end of which extends into a valve assembly. The end of tube 12 extends through a bushing 14 to fit tightly into a control member 15, which is attached to a pivot 16 by a set screw 13.

Referring to Fig. 4 of the drawings, bushing 14 is sealed against leakage by a gasket 17. A coil spring 27 surrounds the end of tube 12 between a stop collar 18 on tube 12 and the end of bushing 14 to hold the opposite end of bushing 14 in engagement with gasket 17.

Referring to Fig. 3 of the drawings, water is obtained from a suitable conventional source of pressure water supply such as that available in cities through a water inlet pipe 19, which is partially sealed off by a plug 20. An elongated member 21 is mounted in plug 20 and extends upwardly into a fitting 22. Elongated member 21 has a small passage 23 extending longitudinally therethrough, which is adapted to be sealed by a valve washer 24, which is mounted in control member 15.

A coil spring 25 surrounds the outside of elongated member 21, with one end bearing against the top of plug 20 and the other end bearing against the bottom of valve washer 24. Coil spring 25 thus tends to unseat valve washer 24 from the end of passage 23 and tends to permit water to flow from inlet pipe 19 into fitting 22.

Water reservoir 10 is adapted to exert downward pressure on valve washer 24 to overcome the pressure of coil spring 25 and seal off the end of passage 23 to prevent water from flowing into fitting 22 when reservoir 10 holds a certain quantity of water.

A water outlet pipe 26 is connected to one side of fitting 22 and provides a water supply for the poultry or animals, which pipe is not shown fully in the drawings. In the case of poultry, the water is drunk from valve fittings which are screwed into the pipe.

In operation, if the water outlet pipe 26 is empty, water reservoir 10 will also be empty and its weight will not be sufficient to counteract the pressure of coil spring 25, which holds valve washer 24 away from the end of passage 23 and permits water to flow from the source of pressure water supply through water inlet pipe 19 into fitting 22 and out into water outlet pipe 26.

When water supply pipe 26 is substantially filled, water flows upwardly through tube 12 into water reservoir 10. This flow continues until the weight of the water which is accumulated and held in the reservoir 10 is sufficient to cause it to move downwardly, moving tube 12 and control member 15 downwardly against the pressure of coil spring 25 to cut off the flow of water by sealing the end of passage 23.

In use, a delicate balance is maintained between the water in water outlet pipe 26 and that in water reservoir 10. If the poultry consume a small amount of water from the water supply pipe 26, this water is replaced by water from the reservoir 10. As soon as the water in reservoir 10 falls below the critical limit, valve washer 24 is momentarily lifted and a small amount of water enters. This new water replaces that which was taken from water reservoir 10, so that valve washer 24 is again closed.

This action is the reason applicant's device is described as a pressure reducer, since its effect is to cause water to flow from the high pressure city supply directly into the water outlet pipe at a greatly reduced pressure.

At the present time, this is customarily accomplished by means of a water tank in which a float is suspended. My invention does away with the tank completely, thus saving money both on the original installation and in maintenance.

It is possible to eliminate coil spring 25 from my device by attaching the ends of coil spring 27 to stop collar 18 and bushing 14 and disposing coil spring 27 so that a downward movement of water reservoir 10 will act to tighten its coils. In this way, coil spring 27 will act in the same manner in which coil spring 25 acts and will provide a counter-balance for the weight of the water in reservoir 10.

It should be understood that while the element 24 is referred to as a washer, it is not perforated but is a solid unperforated disc.

I claim:

1. An automatic watering device comprising a water inlet pipe connected to a source of high pressure water supply, a water outlet pipe, said pipes being connected to a fitting, a plug mounted in said inlet pipe, an elongated member extending upwardly from said plug, a passage extending through said upright member and plug to permit the flow of water therethrough, a control member pivotally mounted adjacent one end of said fitting and extending closely adjacent to the upper end of said passage, a coil spring surrounding said elongated member and extending between the top of said plug and the bottom of said control member, a tube connected to said control member, a water reservoir connected to the opposite end of said tube, said tube adapted to carry water from said inlet pipe to said water reservoir and from said reservoir to said water outlet pipe, sealing means carried by said control member and adapted to seal off the end of said passage to prevent the flow of water therethrough when said control member is pivoted downwardly by the weight of water contained in said reservoir, said control member adapted to be moved upwardly by the pressure of said coil spring when a lesser quantity of water is held in said reservoir to open said passage and permit water to flow therethrough.

2. An automatic watering device comprising a water inlet pipe connected to a source of high pressure water supply, a water outlet pipe, said pipes being connected to a fitting, a plug mounted in said inlet pipe, an elongated member having its base disposed within said plug and having a portion extending upwardly therefrom, said elongated member having a passage extending therethrough, a control member pivotally mounted adjacent one end of said fitting and extending closely adjacent to the upper end of said passage, a disk carried by said control member, said disk being disposed adjacent the upper end of said passage, a coil spring surrounding said elongated member and extending between the top of said plug and the bottom of said disk, a tube connected to said control member, a water reservoir connected to the opposite end of said tube, said tube adapted to carry water from said inlet pipe to said water reservoir and from said reservoir to said water outlet pipe, said disk being adapted to seal off the end of said passage to prevent the flow of water therethrough when said control member is pivoted downwardly by the weight of water contained in said reservoir, said control member adapted to be moved upwardly by the pressure of said coil spring when a lesser quantity of water is held in said reservoir to move said disk upwardly from the top of said passage and permit water to flow therethrough.

3. An automatic watering device comprising a water inlet pipe connected to a source of high pressure water supply, a water outlet pipe, said pipes being connected to a fitting, a plug mounted in said inlet pipe, an elongated member extending upwardly from said plug, a passage extending through said upright member and plug to permit the flow of water therethrough, a control member pivotally mounted adjacent one end of said passage, a coil spring disposed within said fitting and extending between the bottom of said fitting and the bottom of said control member, a tube connected to said control member, a water reservoir connected to the opposite end of said tube, said tube adapted to carry water from said inlet pipe to said water reservoir and from said reservoir to said water outlet pipe, said control member being adapted to seal off the end of said passage to prevent the flow of water therethrough when said control member is pivoted downwardly by the weight of water contained in said reservoir, said control member adapted to be moved upwardly by the pressure of said coil spring when a lesser quantity of water is held in said reservoir to open said passage and permit water to flow therethrough.

References Cited in the file of this patent

UNITED STATES PATENTS

| | | |
|---|---|---|
| 1,213,870 | Haynes | Jan. 30, 1917 |
| 1,241,005 | Nordqvist | Sept. 25, 1917 |